United States Patent
Watanabe et al.

(10) Patent No.: US 12,339,681 B2
(45) Date of Patent: Jun. 24, 2025

(54) CONTROL DEVICE FOR SPOOL TYPE FLOW CONTROL VALVE

(71) Applicant: SUMITOMO HEAVY INDUSTRIES, LTD., Tokyo (JP)

(72) Inventors: Marino Watanabe, Kanagawa (JP); Akira Kondo, Kanagawa (JP); Shinya Hamada, Kanagawa (JP); Tatsuya Yoshida, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 543 days.

(21) Appl. No.: 17/575,257

(22) Filed: Jan. 13, 2022

(65) Prior Publication Data
US 2022/0221881 A1     Jul. 14, 2022

(30) Foreign Application Priority Data
Jan. 14, 2021   (JP) ................... 2021-004383

(51) Int. Cl.
*G05D 7/06*       (2006.01)
*G05B 19/416*   (2006.01)

(52) U.S. Cl.
CPC ......... *G05D 7/0623* (2013.01); *G05B 19/416* (2013.01); *G05D 7/0635* (2013.01); *G05B 2219/37371* (2013.01)

(58) Field of Classification Search
CPC .............................. G05B 2219/3737
See application file for complete search history.

(56) References Cited

U.S. PATENT DOCUMENTS

| | | | | |
|---|---|---|---|---|
| 6,272,401 | B1* | 8/2001 | Boger | F15B 21/087 700/282 |
| 6,289,259 | B1* | 9/2001 | Choi | B23K 3/0623 425/149 |
| 2003/0115866 | A1* | 6/2003 | Price | F15B 21/087 60/431 |
| 2007/0277526 | A1* | 12/2007 | Malm | F02M 21/02 60/602 |
| 2017/0175920 | A1* | 6/2017 | El Ferik | G05B 13/041 |
| 2018/0335162 | A1* | 11/2018 | Brewer | F16K 11/0716 |

FOREIGN PATENT DOCUMENTS

JP     2002-297243 A     10/2002

* cited by examiner

*Primary Examiner* — Nathan L Laughlin
(74) *Attorney, Agent, or Firm* — Michael Best & Friedrich LLP (57) ABSTRACT

There is provided a control device that controls a controlled variable of a control target to a target value by controlling a flow rate of gas supplied to and discharged from the control target by a spool type flow control valve. The control device includes a controller that generates a spool position command of the spool type flow control valve, based on the target value, and a non-linear compensator that applies a correction for linearly compensating for non-linear flow rate characteristics of the spool type flow control valve to the generated spool position command, and outputs the command to the spool type flow control valve.

5 Claims, 7 Drawing Sheets

CONTROL DEVICE FOR SPOOL TYPE FLOW CONTROL VALVE

RELATED APPLICATIONS

The content of Japanese Patent Application No. 2021-004383, on the basis of which priority benefits are claimed in an accompanying application data sheet, is in its entirety incorporated herein by reference.

BACKGROUND

Technical Field

Certain embodiments of the present invention relate to a control device.

Description of Related Art

A spool type flow control valve that controls a flow rate of gas supplied to and discharged from a control target such as an air stage is known. The spool type flow control valve supplies the gas from a supply port to a control port and the control target by operating a spool, and discharges the gas from the control port and the control target to an exhaust port.

In the related art, a spool type flow control valve has been proposed in which a spool is supported by a sleeve via a static pressure air bearing in a non-contact manner (refer to the related art). According to the spool type flow control valve, sliding friction is not generated between the sleeve and the spool. Accordingly, the spool can be positioned with high accuracy. Therefore, the flow rate of the gas supplied to the control target can be controlled with high accuracy.

SUMMARY

According to an embodiment of the present invention, there is provided a control device that controls a controlled variable of a control target to a target value by controlling a flow rate of gas supplied to and discharged from the control target by a spool type flow control valve. The control device includes a controller that generates a spool position command of the spool type flow control valve, based on the target value, and a non-linear compensator that applies a correction for linearly compensating for non-linear flow rate characteristics of the spool type flow control valve to the generated spool position command, and outputs the command to the spool type flow control valve.

DETAILED DESCRIPTION

As a result of studying flow rate characteristics of a spool type flow control valve, the present inventor has recognized the following problems.

In the spool type flow control valve, due to a relationship of a gap between a valve body of a spool and an opening portion of a control port, non-linearity occurs in the flow rate characteristics, when the spool is located in a vicinity of a neutral position and when the spool is not in the vicinity of the neutral position. Due to the non-linearity, controllability of a control target connected to the control port deteriorates.

It is desirable to provide a technique in which a spool type flow control valve can improve controllability of a control target which a gas is supplied to and discharged from.

Any desired combinations of the above-described components or those in which the components and expressions according to the embodiments of the present invention are substituted with each other in methods, devices, and systems are also effective as an aspect according to the present invention.

According to embodiments of the present invention, it is possible to improve controllability of a control target which a gas is supplied to and discharged from by a spool type flow control valve.

The same reference numerals will be assigned to components and members which are the same as or equal to each other in each drawing, and repeated description will appropriately be omitted. In addition, dimensions of the members in each drawing are appropriately enlarged or reduced to facilitate understanding. In addition, in each drawing, some of the members that are not important for describing the embodiments are omitted in the illustration.

Figure 1:
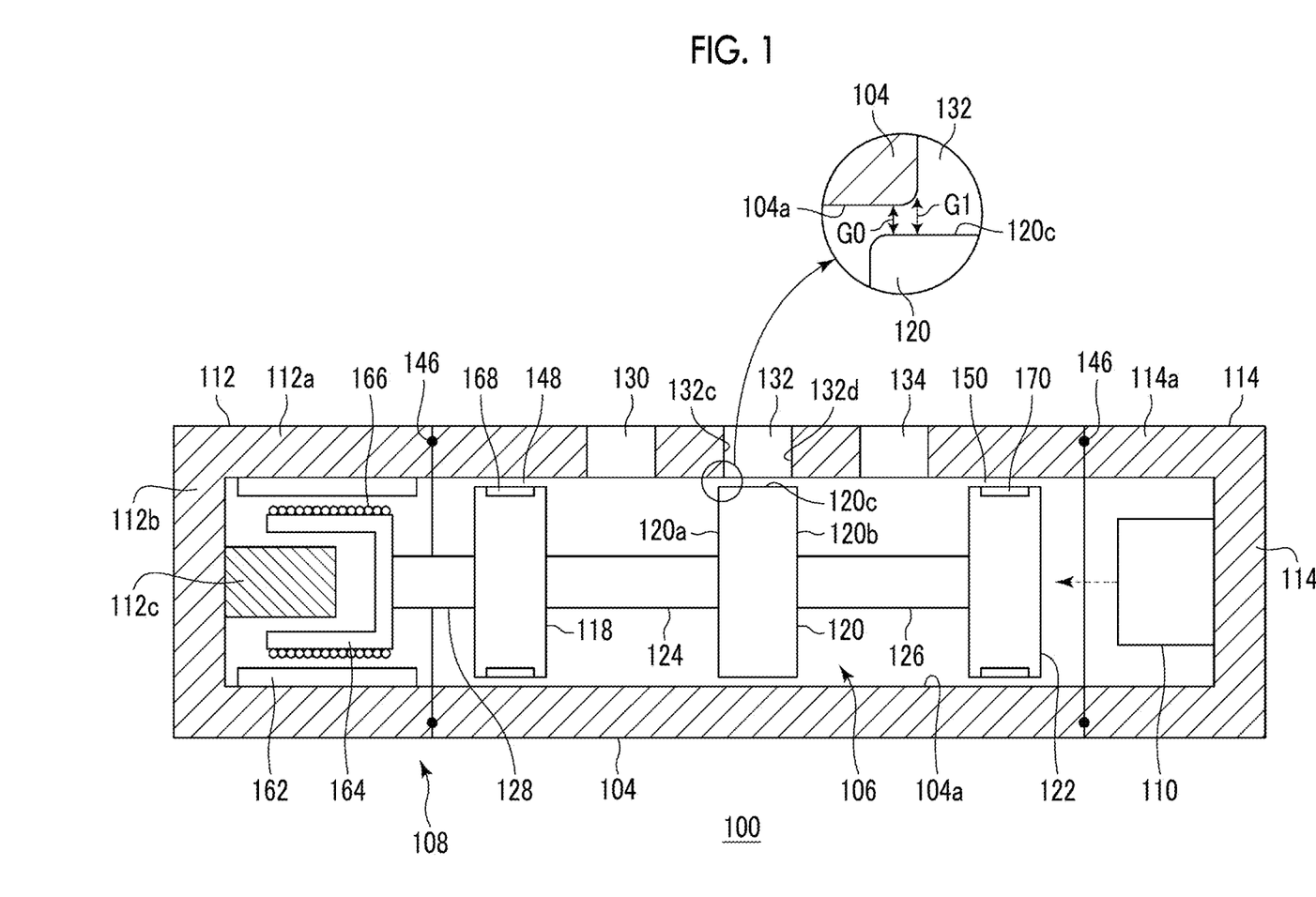
FIG. 1 is a view schematically illustrating a spool type flow control valve according to an embodiment.

FIG. 1 is a view schematically illustrating a spool type flow control valve (servo valves) 100. The spool type flow control valve 100 is a flow control valve that controls a flow rate of gas supplied to a control target. The control target of the spool type flow control valve 100 is not particularly limited. However, for example, the control target is an air actuator. In this case, the spool type flow control valve 100 controls the flow rate of the gas supplied to the air actuator, that is, air.

The spool type flow control valve 100 includes a cylindrical sleeve 104, a spool 106 accommodated in the sleeve 104, an actuator 108 provided on one end side of the sleeve 104 and driving the spool 106 to move inside the sleeve 104, a position detection unit 110 provided on the other end side of the sleeve 104 and detecting a position of the spool 106, and a cover 114 connected to the other end side of the sleeve 104 and accommodating the position detection unit 110.

Hereinafter, a direction parallel to a center axis of the sleeve 104 will be referred to as an axial direction. In addition, a side where the actuator 108 is provided with respect to the sleeve 104 will be referred to as a left side, and a side where the position detection unit 110 is provided with respect to the sleeve 104 will be referred to as a right side.

The spool 106 includes a first support portion 118, a second support portion 122, a valve body 120, a first connection shaft 124, a second connection shaft 126, and a drive shaft 128. All of the first support portion 118, the valve body 120, and the second support portion 122 have a columnar shape, and are aligned in this order from the left side in an axial direction. The first connection shaft 124 extends in the axial direction, and connects the first support portion 118 and the valve body 120 to each other. The second connection shaft 126 extends in the axial direction, and connects the valve body 120 and the second support portion 122 to each other. The drive shaft 128 protrudes from the first support portion 118 toward the left side in the axial direction.

The actuator (linear drive unit) 108 moves the drive shaft 128 and the spool 106 in the axial direction. The actuator 108 is not particularly limited, but is a voice coil motor in the illustrated example.

The first support portion 118 and the second support portion 122 of the spool 106 are supported in a state of floating from the sleeve 104 by a static pressure gas bearing, that is, without being in contact with the sleeve 104.

In the present embodiment, an air pad 168 serving as the static pressure gas bearing is provided on an outer peripheral surface of the first support portion 118. The air pad 168 ejects compressed gas supplied from an air supply system (not illustrated) into a first gap 148 serving as a gap between the first support portion 118 and the sleeve 104. In this manner, a high-pressure gas layer is formed in the first gap 148, and the air pad 168 and the first support portion 118 float from the sleeve 104. Instead of the outer peripheral surface of the first support portion 118, the air pad 168 may be provided in a portion on an inner peripheral surface 104a of the sleeve 104 facing the first support portion 118.

Similarly, an air pad 170 serving as the static pressure gas bearing is provided on an outer peripheral surface of the second support portion 122. The air pad 170 ejects the compressed gas supplied from the air supply system (not illustrated) into the second gap 150 serving as a gap between the second support portion 122 and the sleeve 104. In this manner, the high-pressure gas layer is formed in the second gap 150, and the air pad 170 and the second support portion 122 float from the sleeve 104. Instead of the outer peripheral surface of the second support portion 122, the air pad 170 may be provided in a portion on the inner peripheral surface 104a of the sleeve 104 facing the second support portion 122.

FIG. 1 illustrates the first gap 148 and the second gap 150 which are exaggerated. In actual, a size of the first gap 148 and the second gap 150 is preferably approximately several microns in order to form the static pressure gas bearing.

The position detection unit 110 is not particularly limited. However, in this example, the spool 106 is configured to be detectable in a non-contact manner. For example, a laser sensor is used for the position detection unit 110.

The cover 114 has a bottomed cup shape in which a cylindrical portion 114a and a bottom portion 114b are integrally formed. The cover 114 is connected to a right end of the sleeve 104 so that the bottom portion 114b is located on the right, that is, the opening portion in the right end of the sleeve 104 and the opening portion face each other.

The cover 114 may be formed integrally with the sleeve 104. In other words, instead of a configuration in which the spool type flow control valve 100 does not include the cover 114, the sleeve 104 may be formed in a bottomed cylindrical shape in which only a left end is open.

The actuator 108 includes a yoke 112, a magnet 162, a coil bobbin 164, and a coil 166. The yoke 112 is made of a magnetic body such as iron. The yoke 112 has a bottomed cup shape in which a cylindrical portion 112a and a bottom portion 112b are integrally formed. The yoke 112 is connected to the left end of the sleeve 104 so that the bottom portion 112b is located on the left, that is, the opening portion in the left end of the sleeve 104 and the opening portion face each other.

The yoke 112 further has a columnar protrusion 112c that protrudes rightward from the bottom portion 112b in the axial direction. The magnet 162 is bonded and fixed to an inner peripheral surface of the cylindrical portion 112a to surround the protrusion 112c. The magnets 162 may be continuous in the circumferential direction, or may be discontinuous in the circumferential direction, that is, may intermittently be provided.

The coil bobbin 164 is provided inside the magnet 162. The coil bobbin 164 surrounds the protrusion 112c, and one end side is connected to the drive shaft 128. The coil 166 is wound around an outer periphery of the coil bobbin 164. The actuator 108 generates a force that moves the coil bobbin 164 around which the coil 166 is wound, and the spool 106 to any place in the axial direction, in response to a current supplied to the coil 166 and a current direction. A positional relationship between the magnet 162 and the coil 166 may be reversed. That is, the magnet 162 may be provided inside the coil 166, specifically, on the outer peripheral surface of the protrusion 112c.

A portion between the sleeve 104 and the yoke 112 of the actuator 108 and a portion between the sleeve 104 and the cover 114 are respectively sealed by sealing members 146 such as an O-ring and a metal seal. Therefore, the sleeve 104, the yoke 112, and the cover 114 are internally sealed except for a plurality of ports (to be described later).

The sleeve 104 has a supply port 130, a control port 132, and an exhaust port 134. The supply port 130, the control port 132, and the exhaust port 134 are respectively communication holes that communicate with the inside and the outside of the sleeve 104, and extend in a direction perpendicular to the axial direction.

The supply port 130 is connected to a compressed gas supply source (not illustrated) via a tube or a manifold (all are not illustrated). The control port 132 is connected to a control target (not illustrated) via a tube or a manifold (all are not illustrated). When viewed in a radial direction, the control port 132 is formed in a rectangular shape having four sides parallel to the axial direction and the circumferential direction. The exhaust port 134 is open to the atmosphere via a tube or a manifold (all are not illustrated). In FIG. 1, the spool 106 is located at a neutral position, and the control port 132 is closed by the valve body 120. The neutral position refers to a position of the spool 106 where positions in the axial direction of a central portion of the valve body 120 in the axial direction and a central portion of the control port 132 in the axial direction coincide with each other.

Figure 2A:
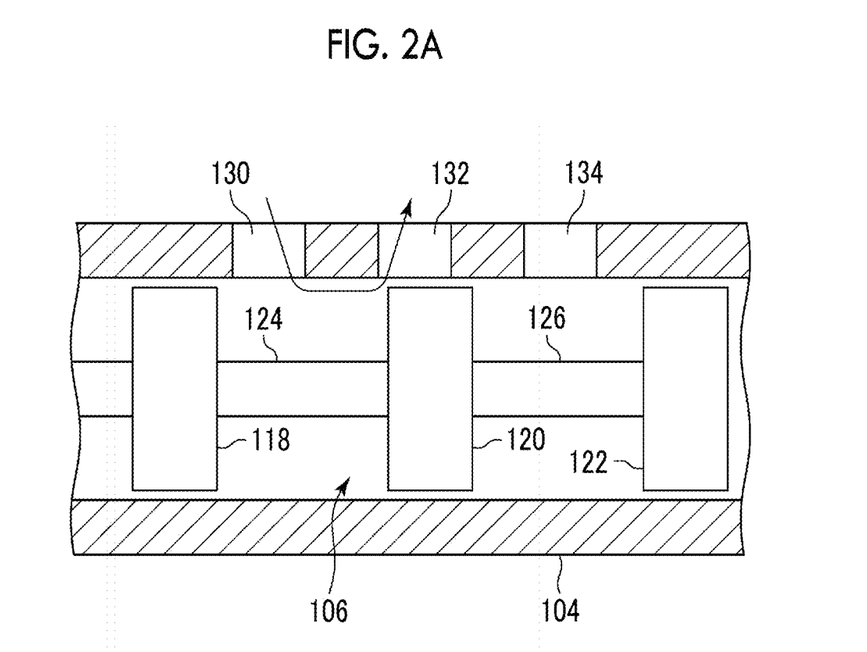
FIGS. 2A and 2B are views for describing an operation of the spool type flow control valve in FIG. 1.
Figure 2B:
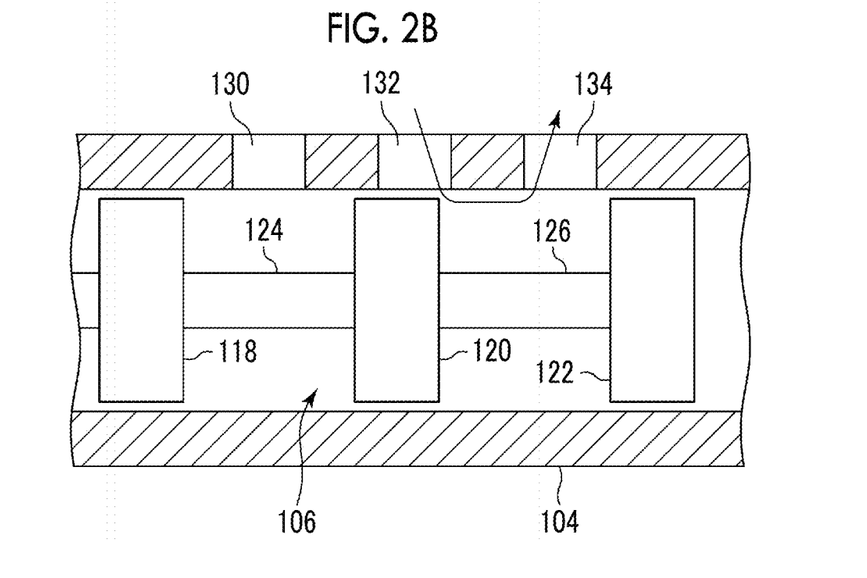

The above-described configuration is a basic configuration of the spool type flow control valve 100. Subsequently, an operation thereof will be described. FIGS. 2A and 2B are views for describing the operation of the spool type flow control valve 100 in FIG. 1.

FIG. 2A illustrates a state where the spool 106 in a state illustrated in FIG. 1 is driven by the actuator 108 and moves rightward in the axial direction. In this state, the control port 132 closed by the valve body 120 is opened. The supply port 130 and the control port 132 communicate with each other. The compressed gas from the compressed gas supply source is supplied to the control target through the supply port 130, the inside of the sleeve 104, and the control port 132. In this case, a position of the spool 106 is controlled, based on a detection result obtained by the position detection unit 110, and the opening area of the control port 132 is controlled by the valve body 120, thereby controlling a flow rate of the compressed gas supplied to the control target.

FIG. 2B illustrates a state where the spool 106 in a state illustrated in FIG. 1 is driven by the actuator 108 and moves leftward in the axial direction. In this state, the control port 132 closed by the valve body 120 is opened. The control port 132 and the exhaust port 134 communicate with each other. The compressed gas from the control target is exhausted to the atmosphere through the control port 132, the inside of the sleeve 104, and the exhaust port 134. In this case, the position of the spool 106 is controlled, based on a detection result obtained by the position detection unit 110, and the opening area of the control port 132 is controlled by the valve body 120, thereby controlling the flow rate of the compressed gas exhausted from the control target.

Figure 3A:
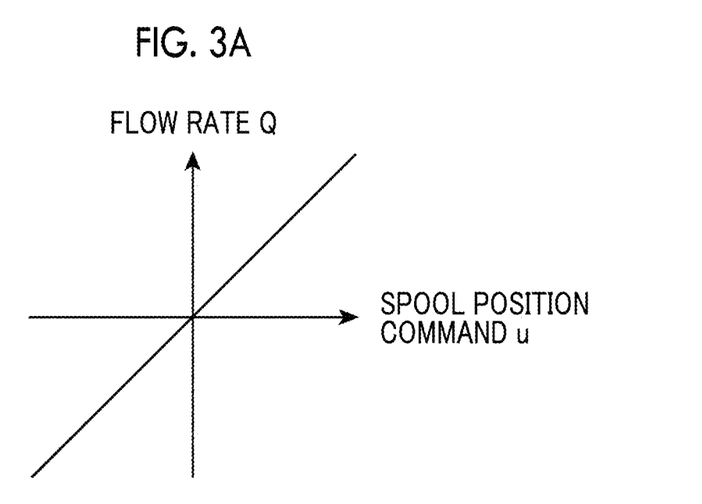
FIGS. 3A to 3C are views for describing flow rate characteristics of the spool type flow control valve.
Figure 3B:
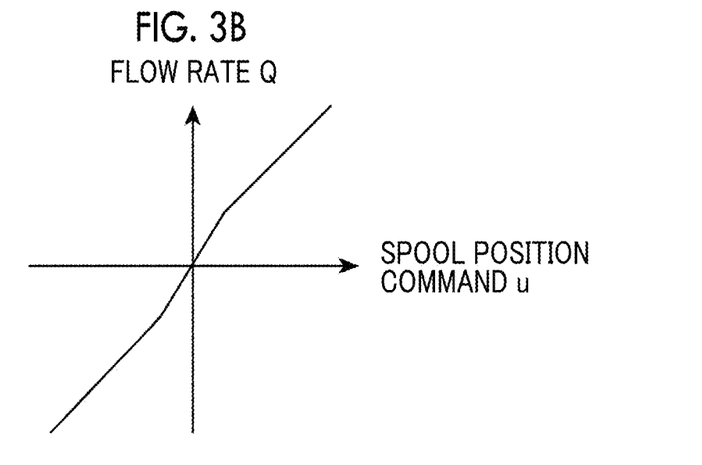
Figure 3C:
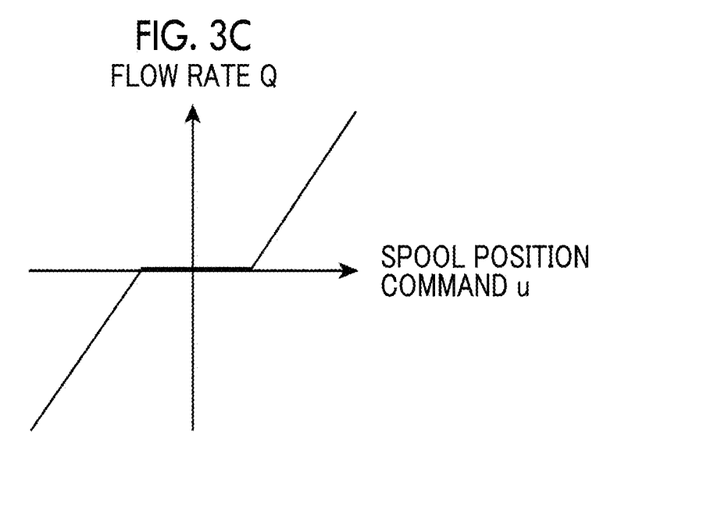

FIGS. 3A to 3C are views for describing flow rate characteristics of the spool type flow control valve. In FIGS. 3A to 3C, a positive flow rate indicates a flow rate supplied from the supply port to the control port and the control target, and a negative flow rate indicates a flow rate exhausted from the control port and the control target to the exhaust port.

FIG. 3A illustrates ideal flow rate characteristics. FIG. 3B illustrates flow rate characteristics having non-linearity. The non-linearity of the flow rate characteristics leads to a decrease in the controllability of the flow rate. FIG. 3C illustrates flow rate characteristics having a dead zone in the vicinity of a neutral position. When a lap amount increases, the flow rate characteristics appear. The lap amount is the length at which the valve body 120 protrudes in the axial direction from the control port 132 when the sleeve 104 is located at the neutral position, in other words, the length at which the valve body 120 and the sleeve 104 are superimposed with (overlap) each other outside the control port 132 in the axial direction. When there is a dead zone, the control target cannot realize high responsiveness. Accordingly, this configuration is not preferable.

Figure 4A:
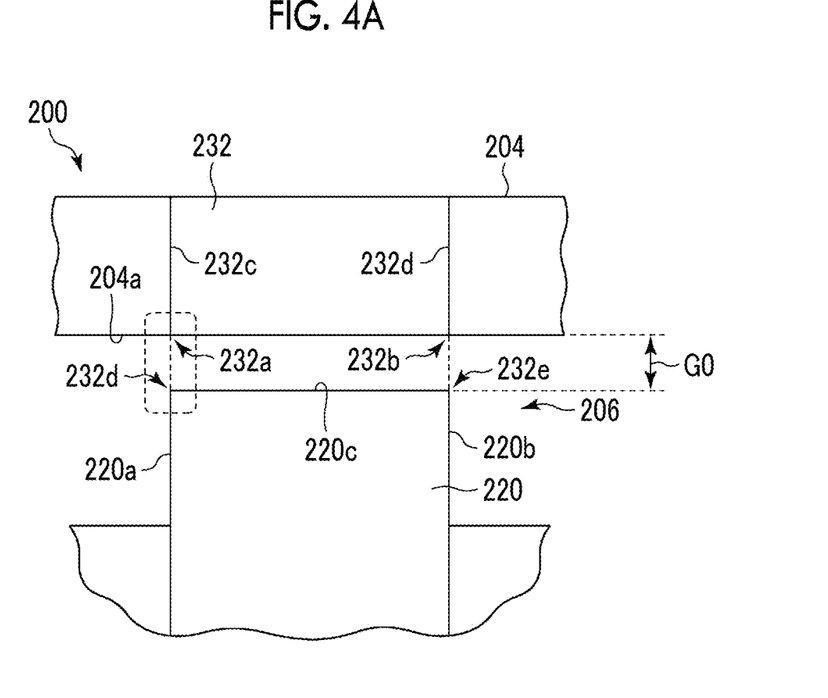
FIGS. 4A and 4B are sectional views illustrating a valve body and a control port of a spool type flow control valve according to a reference example and a periphery thereof.
Figure 4B:
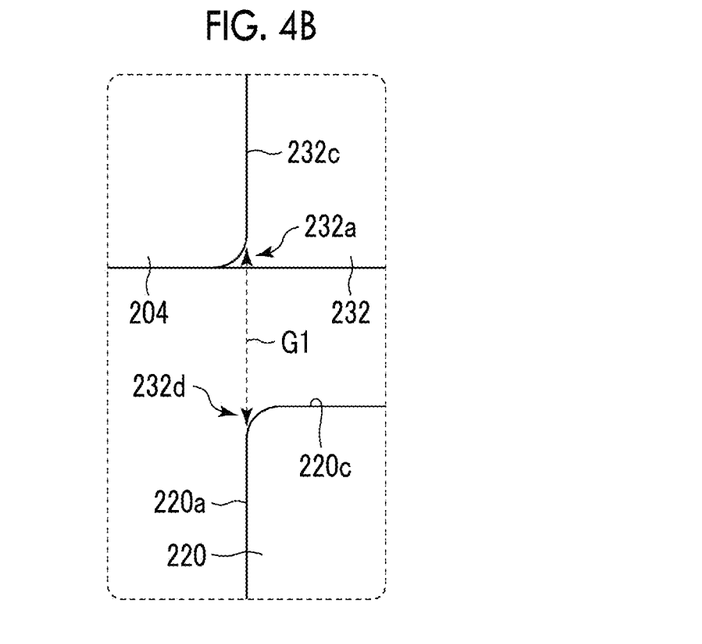

FIGS. 4A and 4B are sectional views illustrating a valve body 220 and a control port 232 of a spool type flow control valve 200 according to a reference example and a periphery thereof. FIG. 4B is an enlarged view of a portion surrounded by a broken line in FIG. 4A.

Theoretically, in order to realize the ideal flow rate characteristics illustrated in FIG. 3A, at least the followings are required.
(i) Corner portions 232d and 232e where right and left axial end surfaces 220a and 220b of the valve body 220 and the outer peripheral surface 220c are connected to each other are formed at a so-called pin angle. That is, the corner portion 220d is formed at a right angle in a cross section passing through the center axis of the valve body 220.
(ii) Opening portion peripheral edges 232a and 232b on the inner peripheral surface side of the control port 232 are formed at a so-called pin angle. That is, the opening portion peripheral edge 232a is formed at a right angle in a cross section passing through the center axis of the sleeve 204.
(iii) The valve body 220 and the control port 232 are formed so that the right and left axial end surfaces 220a and 220b of the valve body 220 and right and left peripheral surfaces 232c and 232d of the control port 232 are flush with each other when the spool 206 is located at the neutral position as illustrated in FIG. 4A.

However, in reality, due to limitation of a processing technique, not only the corner portions 232d and 232e of the valve body 220 but also the opening portion peripheral edges 232a and 232b of the control port 132 cannot be formed exactly at the pin angle, and microscopically, both are formed at a round angle. Therefore, for example, in a case where the valve body 220 and the control port 232 are configured so that the right and left axial end surfaces 220a and 220b of the valve body 220 and the right and left peripheral surfaces 232c and 232d of the control port 232 are flush with each other when the spool 206 is located at the neutral position, a gap G1 between the outer peripheral surface 220c of the valve body 220 and the opening portion peripheral edges 232a and 232b of the control port 132 when the spool 206 is located at the neutral position is wider than a gap G0 between the outer peripheral surface 220c of the valve body 220 and the inner peripheral surface 204a of the sleeve 204. As a result, the flow rate characteristics of the spool type flow control valve according to the reference example become the flow rate characteristics having non-linearity as illustrated in FIG. 3B.

For example, the valve body 220 and the sleeve 204 are overlapped with each other to bring the gap G1 closer to the gap G0 to such an extent that the dead zone is not generated. In this manner, the flow rate characteristics can be close to the ideal flow rate characteristics illustrated in FIG. 3A to some extent.

However, it is actually impossible to realize the ideal flow rate characteristics illustrated in FIG. 3A. Although there is a difference in some degrees, the flow rate characteristics of the spool type flow control valve have non-linearity.

Therefore, the present inventors have recognized that the non-linearity of the flow rate characteristics of the spool type flow control valve 100 are linearly compensated by performing control. Hereinafter, a configuration will be described in detail.

Figure 5:
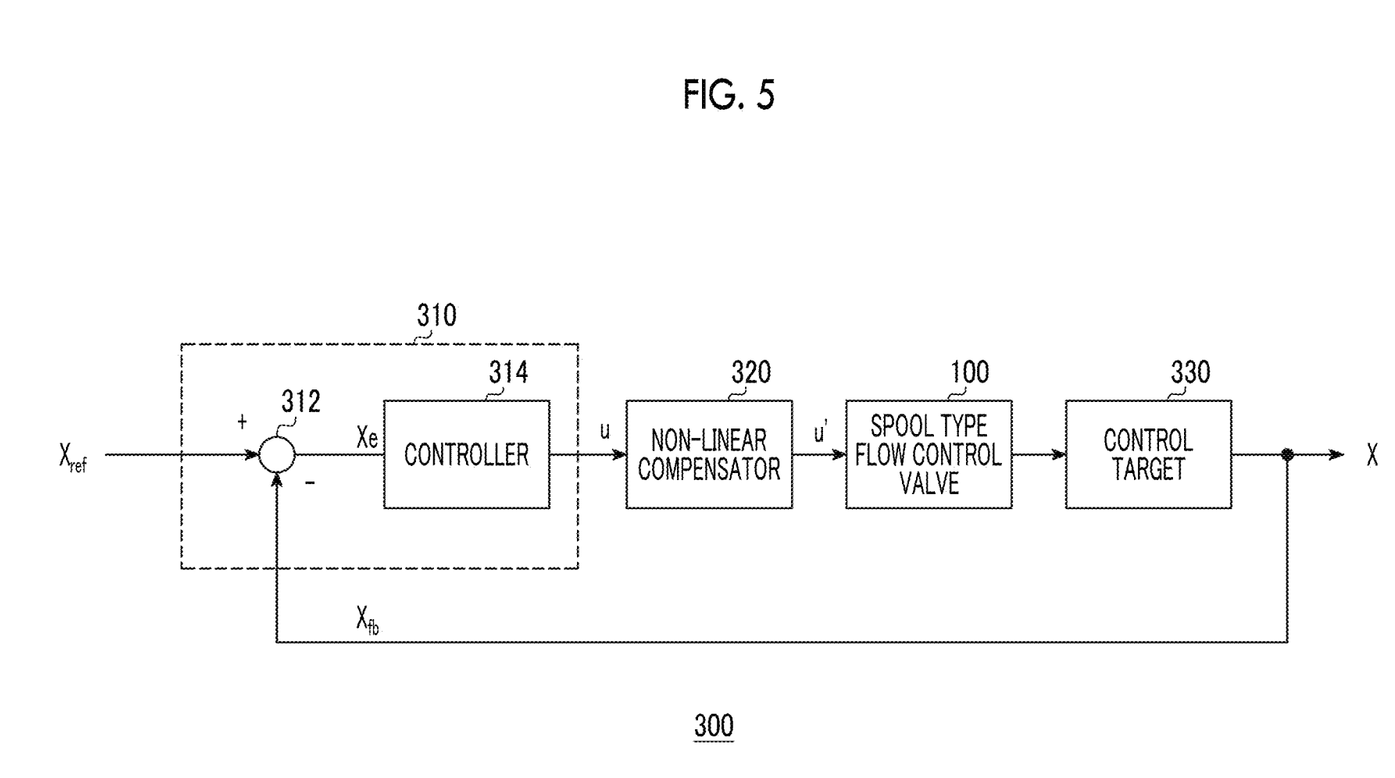
FIG. 5 is a block diagram illustrating a basic configuration of a control system of a control target.

FIG. 5 is a block diagram illustrating a basic configuration of a control system 300 of a control target which the gas is supplied to and discharged from by the spool type flow control valve 100. The control system 300 includes a controller 310, a non-linear compensator 320, the spool type flow control valve 100, and a control target 330. Here, the control target 330 is an air actuator. In addition, a spool position command (manipulated variable) u for the spool type flow control valve 100 is input, and a stroke position (that is, the controlled variable) x of the air actuator is output. The stroke position x of the air actuator is detected by a position detector (not illustrated).

The controller 310 is a feedback controller in this example, and includes a subtractor 312 and a controller 314. The controller 310 generates the spool position command u for the spool type flow control valve 100 so that a detection value $x_{fb}$ of the stroke position x is closer to a target position (target value) $x_{ref}$. For example, the target position $x_{ref}$ is assigned to the controller 310 by another higher-ranking controller.

Specifically, the subtractor 312 generates an error (difference) $x_e$ between the detection value $x_{fb}$ of the stroke position x of the air actuator and the target position $x_{ref}$. The controller 314 performs a PI (proportional/integral) control calculation so that the error $x_e$ becomes zero, and generates the spool position command u for the spool type flow control valve 100. The controller 314 may perform a P (proportional) control calculation, a PID (proportional/integral/differential) control calculation, or other control calculations instead of the PI control calculation. Processing of the controller 314 can also be realized by an analog circuit using an error amplifier.

Figure 6:
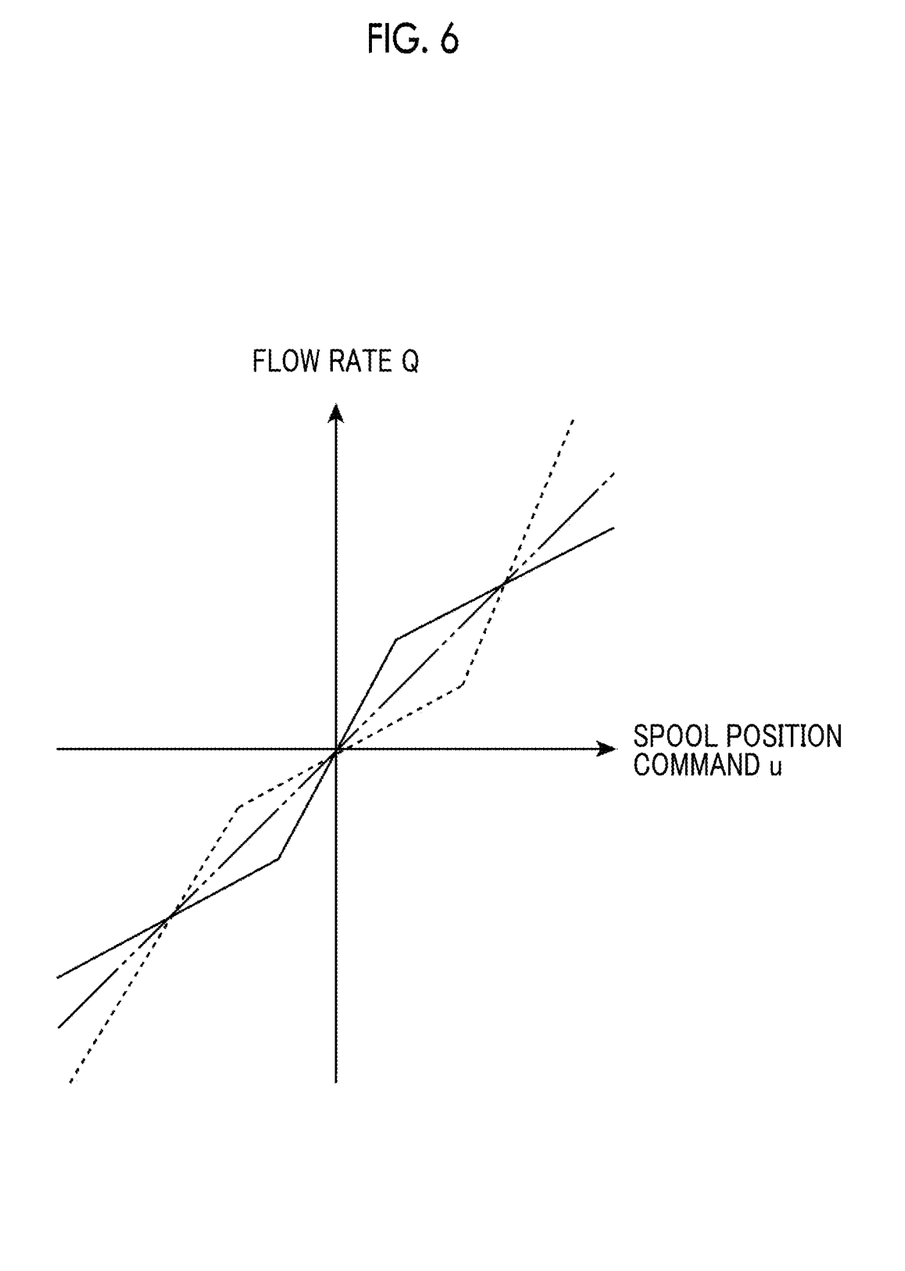
FIG. 6 is a view for describing a function of a non-linear compensator in FIG. 5.

FIG. 6 is a view for describing a function of the non-linear compensator 320. The non-linear compensator 320 applies a correction for linearly compensating the non-linear flow rate characteristics (solid line graph) of the spool type flow control valve 100 to the spool position command u. Then, the non-linear compensator 320 outputs a spool position command to which the correction is applied (hereinafter, referred to as a correction spool position command u') to the spool type flow control valve 100.

The "linear compensation" is to linearize the flow rate characteristics, specifically, to linearize a relationship between the spool position command u and a flow rate Q of the spool type flow control valve 100 corresponding to correction spool position command u' corresponding to the spool position command u.

In the present embodiment, the correction for linearly compensating the flow rate characteristics is to multiply an inverse function (broken line graph) of the flow rate characteristics. A relationship between the spool position command u and the flow rate Q corresponding to the correction spool position command u' obtained by multiplying the spool position command u by the inverse function is a straight line (linearity) of Q=u (y=x).

The inverse function of the flow rate characteristics may be derived in advance and stored in a storage device (not illustrated) of the controller 310. For example, the inverse function may be derived, based on measured flow rates for a large number of spool positions over an entire stroke range of the spool 106.

In the spool type flow control valve 100, the spool 106 moves in response to the spool position command u', and the gas is supplied to and discharged from the control target 330. In this manner, the stroke position x of the air actuator is changed to be closer to the target position $x_{ref}$.

According to the present embodiment described above, the non-linear flow rate characteristics of the spool type flow control valve 100 are linearly compensated. That is, the spool type flow control valve 100 can behave as the spool type flow control valve having the linear flow rate characteristics. Therefore, it is possible to improve the controllability of the control target over the entire area of the spool position command.

In addition, according to the present embodiment, the non-linear flow rate characteristics of the spool type flow control valve 100 is linearly compensated by performing control. Therefore, the flow rate characteristics do not need to be closer to the ideal flow rate characteristics by processing the spool type flow control valve 100, and manufacturing cost of the spool type flow control valve 100 can be reduced.

Hitherto, the present invention has been described with reference to the embodiments. The embodiments are merely examples. Those skilled in the art will understand that various modification examples can be made for combinations of the respective components or the respective processes, and that the modification examples also fall within the scope of the present invention.

Modification Example 1

As the correction for linearly compensating the flow rate characteristics, in the embodiment, the same correction (correction equation) is applied to the spool position command u in the entire stroke range of the spool 106. However, different corrections may be applied to the spool position command u in the middle range including the neutral position in the stroke range and the spool position command u in two adjacent ranges adjacent to the middle range.

Figure 7:
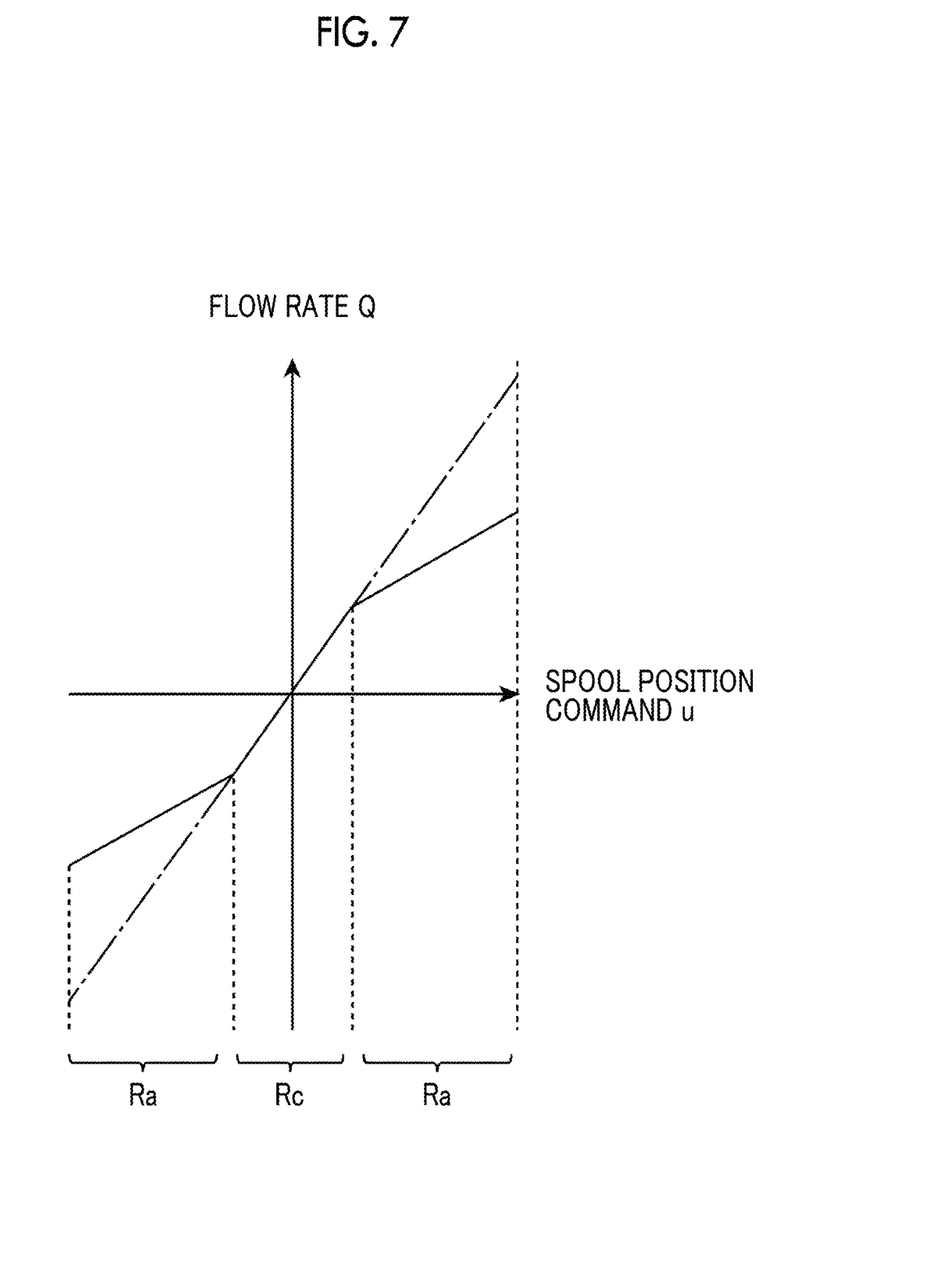
FIG. 7 is a view for describing a function of a non-linear compensator according to a modification example.

FIG. 7 is a view for describing a function of the non-linear compensator 320 according to a modification example.

The non-linear compensator 320 approximates the flow rate characteristics in a middle range Rc of the spool type flow control valve 100 by a linear equation. An approximate equation in the middle range Rc is expressed below.

$$Q = a \times u \, (-u_b \leq u \leq u_b) \quad (1)$$

Here, the approximate equation is defined as follows.
a: coefficient
$u_b$, $-u_b$: spool position at a boundary between the middle range Rc and the two adjacent ranges Ra In addition, the non-linear compensator 320 approximates the flow rate characteristics in the two adjacent ranges Ra of the spool type flow control valve 100 by a linear equation. An approximate equation in the two adjacent ranges Ra is expressed below.

$$Q = b \times u + c \, (u > u_b) \quad (2)$$

$$Q = b \times u - c \, (u < -u_b) \quad (3)$$

Here, the approximate equation is defined as follows. b, c: coefficient

When the flow rate characteristics of the spool type flow control valve 100 are approximated by the equations (1) to (3), the non-linear compensator 320 applies the correction expressed by the following equation to the spool position command u in the middle range Rc.

$$u' = n \times u \, (n \text{ is an arbitrary positive real number}) \, (-u_b \leq u \leq u_b) \quad (4)$$

In addition, the non-linear compensator 320 applies the correction expressed by the following equation to the spool position command u in the two adjacent ranges Ra.

$$u' = (n \times a \times u - c)/b \, (u > u_b) \quad (5)$$

$$u' = (n \times a \times u + c)/b \, (u < -u_b) \quad (6)$$

A relationship between the spool position command u and the flow rate corresponding to the correction spool position command u' obtained by applying the correction of the equations (4) to (6) to the spool position command u is a straight line of Q=n×a×u (straight line of one-dot chain line).

The illustrated example indicates a case of n=1. In the example of n=1, it can be considered that the correction is not applied to the spool position command u in the middle range.

In this modification example, the corrections applied to the spool position command u are switched when the position of the spool 106 is switched from the middle range Rc to the adjacent range Ra and when the position of the spool 106 is switched from the adjacent range Ra to the middle range Rc. Behavior can be unstable when the applied corrections are suddenly switched. Therefore, when the position of the spool 106 is switched between the middle range Rc and the adjacent range Ra, the correction to be applied is gradually changed with the lapse of time. That is, the correction is changed gently or in a stepwise manner.

Specifically, for example, when the position moves from the middle range Rc to the adjacent range Ra, a value obtained by multiplying (u−c) and (u+c) in the equations (5) and (6) is gradually changed from n to na/b with the lapse of time. In addition, for example, when the position moves from the adjacent range Ra to the middle range Rc, a value obtained by multiplying u in the equation (4) is gradually changed from na/b to n with the lapse of time.

According to this modification example, an advantageous effect the same as that of the embodiment can be achieved.

In addition, according to this modification example, when the position is switched between the middle range Rc and the adjacent range Ra, the correction applied to the spool position command u is gradually changed with the lapse of time. Therefore, unstable behavior caused by the suddenly switched correction can be suppressed. In addition, when the position frequently moves between the middle range Rc and the adjacent range Ra, it is possible to prevent the corrections to be applied from being switched in a vibrational manner.

Modification Example 2

In the embodiment, a case has been described where the controller 310 generates the spool position command u by performing feedback-control. However, the controller 310 may generate the spool position command u by performing feedforward-control in addition to the feedback-control or instead of the feedback-control.

Any desired combination of the above-described embodiments and modification examples is also useful as an embodiment of the present invention. A new embodiment generated by the combination has advantageous effects of the respectively combined embodiment and modification examples.

It should be understood that the invention is not limited to the above-described embodiment, but may be modified into various forms on the basis of the spirit of the invention. Additionally, the modifications are included in the scope of the invention.

What is claimed is:

1. A control device that controls a controlled variable of a control target to a target value by controlling a flow rate of gas supplied to and discharged from the control target by a spool type flow control valve, the control device comprising:
   a controller that generates a spool position command of the spool type flow control valve, based on the target value; and
   a non-linear compensator that applies a correction for linearly compensating for non-linear flow rate characteristics of the spool type flow control valve to the generated spool position command, and outputs the command to the spool type flow control valve,
   wherein the non-linear compensator applies different corrections between a spool position command in a middle range including a neutral position in a stroke range of a spool of the spool type flow control valve and a spool position command in an adjacent range adjacent to the middle range, and
   in the correction applied to the adjacent range, flow rate characteristics of the spool type flow control valve in the adjacent range are corrected such that a relationship between the spool position command and the flow rate characteristics of the spool type flow control valve in the adjacent range is the same as a relationship between the spool position command and the flow rate characteristics of the spool type flow control valve in the middle range.

2. The control device according to claim 1,
   wherein the linear compensation is to linearize a relationship between the spool position command generated based on the target value and a flow rate corresponding to the spool position command to which the correction is applied.

3. The control device according to claim 1,
   wherein the correction is to multiply an inverse function of the flow rate characteristics of the spool type flow control valve.

4. A control device that controls a controlled variable of a control target to a target value by controlling a flow rate of gas supplied to and discharged from the control target by a spool type flow control valve, the control device comprising:
   a controller that generates a spool position command of the spool type flow control valve, based on the target value; and
   a non-linear compensator that applies a correction for linearly compensating for non-linear flow rate characteristics of the spool type flow control valve to the generated spool position command, and outputs the command to the spool type flow control valve,
   wherein the non-linear compensator applies different corrections between a spool position command in a middle range including a neutral position in a stroke range of a spool of the spool type flow control valve and a spool position command in an adjacent range adjacent to the middle range, and
   when a position of the spool is switched between the middle range and the adjacent range, the non-linear compensator gradually changes the correction applied to the spool position command from the correction in one range to the correction in the other range.

5. The control device according to claim 4,
   wherein the linear compensation is to linearize a relationship between the spool position command generated based on the target value and a flow rate corresponding to the spool position command to which the correction is applied.

* * * * *